Sept. 19, 1939.   O. S. PETERS   2,173,493
MEASURING APPARATUS
Filed March 9, 1935   2 Sheets-Sheet 1
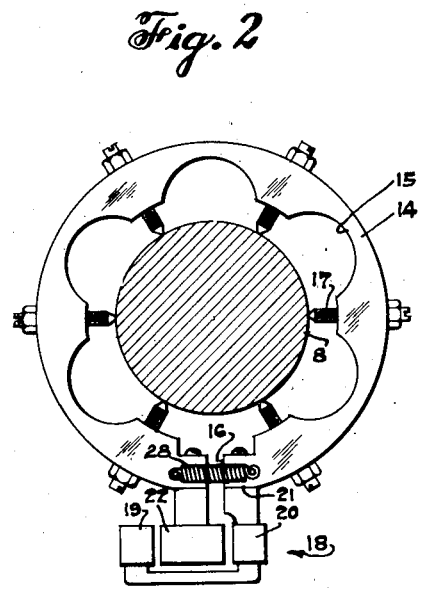
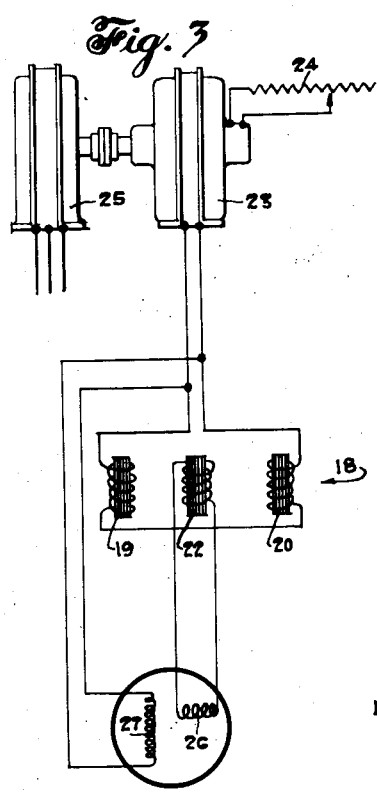
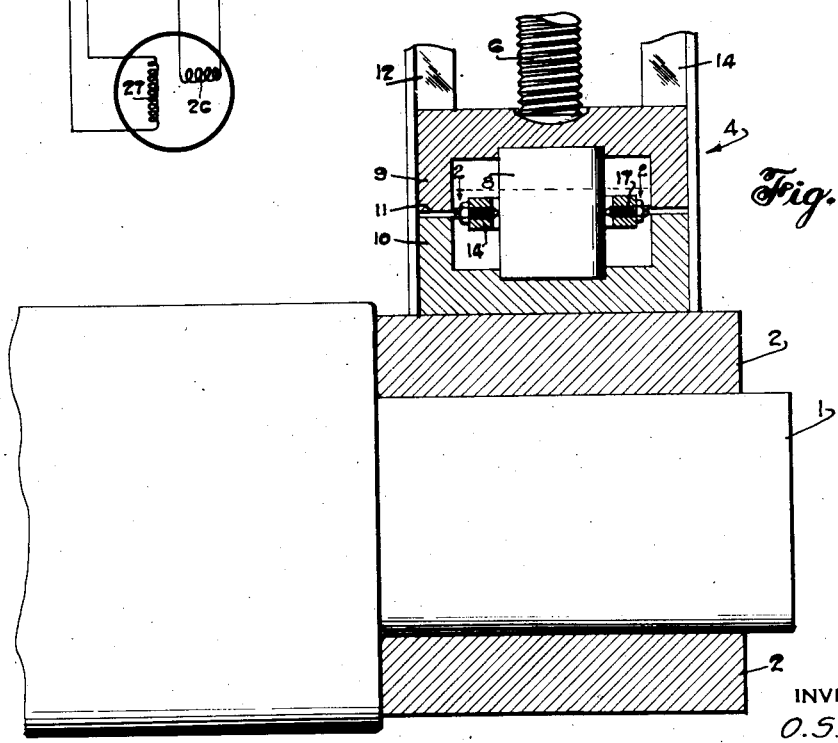
INVENTOR
O. S. Peters
BY
ATTORNEY Sept. 19, 1939.　　　O. S. PETERS　　　2,173,493
MEASURING APPARATUS
Filed March 9, 1935　　　2 Sheets-Sheet 2
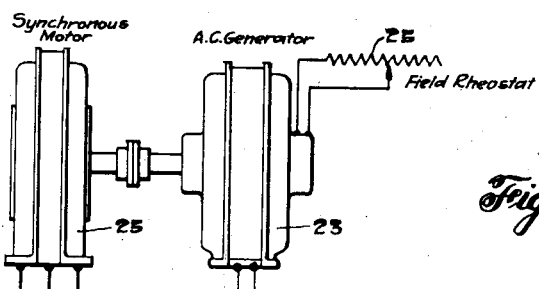
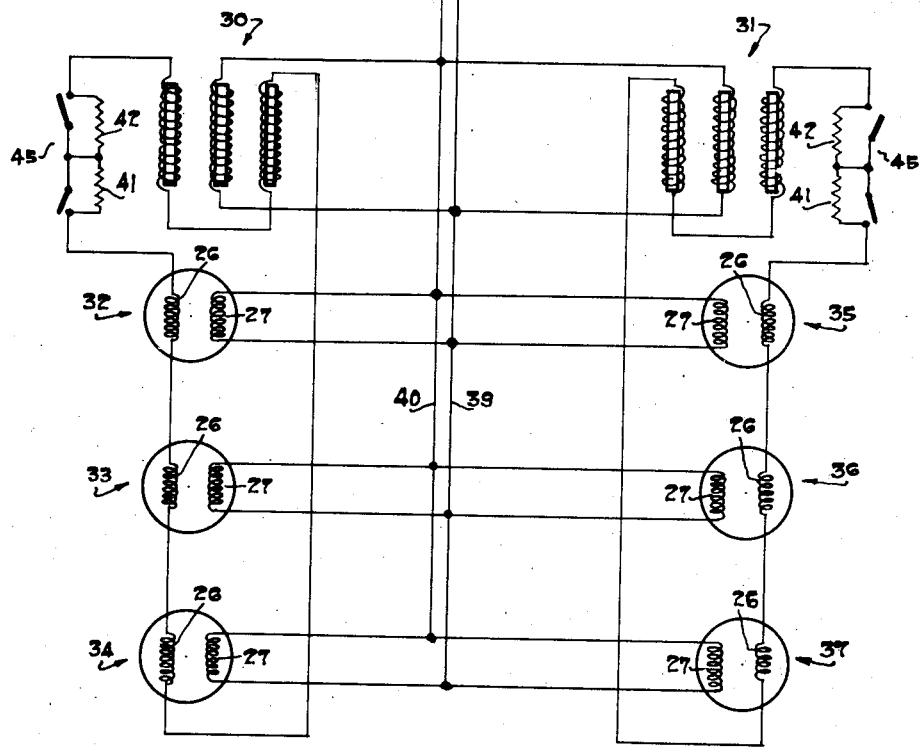
Fig. 4
Fig. 5　　Fig. 6　　Fig. 7
INVENTOR
O. S. Peters
BY
ATTORNEY Patented Sept. 19, 1939

2,173,493

UNITED STATES PATENT OFFICE 2,173,493

MEASURING APPARATUS

Orville S. Peters, Chevy Chase, Md., assignor to Baldwin-Southwark Corporation, a corporation of Delaware Application March 9, 1935, Serial No. 10,174

1 Claim. (Cl. 177—351)

This invention relates generally to an improved method and apparatus for determining and indicating or recording deformation of a pressure block, specimen or othtr deformable member.

While the invention is specifically shown as applied to pressure blocks in connection with rolling mills where it is desirable to accurately determine and control the pressure applied to the rolls, yet the invention is also applicable to measuring strain of other types or forms of deformable members or specimens. Considering the application of pressure blocks, merely for the purpose of a specific example, the blocks are inserted between the bearings of the pressure roll and the screw or other mechanism for applying pressure to the roll, and by previous accurate calibration of the blocks, it is possible to determine the amount of pressure that corresponds to any given deformation or strain thereof. For very large pressures the block is preferably solid, and its radial deformation or circumferential expansion is utilized to determine the pressure, although it will of course be understood that for rolling mills of smaller capacity, or for other applications involving smaller pressures or loads, the pressure block may be either hollow or of U-shape whereby its axial strain may be used to measure the pressure.

It is one object of my invention to provide an improved method and apparatus for accurately determining strain variations of a pressure block and of recording or indicating such variations.

A further object is to provide improved means whereby a very substantial positive operating force may be obtained for an indicating or recording instrument, and at the same time obtain a very sensitive response to variations in deformation of the pressure block.

Another object is to provide an improved combination of elements for obtaining a substantially straight line function of load, thereby insuring consistent accuracy in measurements and readings substantially throughout the load or pressure range of the blocks.

In one specific aspect of the invention I accomplish certain of the foregoing and other objects of the invention by mounting primary and secondary coils of an air gap transformer, with their respective laminated iron cores, on relatively movable portions of a suitable gage frame, this frame being attached to the pressure block through gage points in such a manner as to effect relative movement in the air gap between the cores in proportion to strain variations. The primary coils of the transformer are connected to any main source of current. The secondary coil or coils of the transformer are connected to the current coil of any suitable indicating mechanism, such for example as a wattmeter or equivalent apparatus, while a voltage coil thereof is connected to said main source of current. Said current and voltage coils operate a suitable indicating hand or element as is usual in such indicating apparatus. In this manner I am able to obtain the advantage that power from the exciting circuit for the primary coils furnishes the actuating force for the indicating mechanism while the secondary transformer coil is required to furnish only current to the indicating mechanism, thus minimizing the power that must be drawn from the air gap transformer. Furthermore, since the primary coils of the transformer and the voltage coil of the wattmeter are both excited from the same source, the proper phase relations are maintained between the exciting voltage and current of the wattmeter. Hence, a strong and positive actuating force is obtained while at the same time maintaining a sensitive and accurate control thereof in proportion to the strain of the block.

Other details and construction and arrangement of parts contribute not only to the accurate qualities and reliability of the apparatus but also to the accomplishment of other objects and advantages that will be more apparent to those skilled in the art from the following description of the accompanying drawings in which:

Fig. 1 is a diagrammatic vertical section of a bearing at one end of a roll with my improved pressure block applied thereto;

Fig. 2 is a horizontal sectional view taken on the line 2—2 of Fig. 1;

Fig. 3 is a wiring diagram of my improved apparatus and including a diagrammatic disclosure of certain of the elements;

Fig. 4 is a further wiring diagram showing the manner in which my improved arrangement of circuits and instruments may be embodied in multiple connections;

Figs. 5, 6 and 7 are modified types of pressure resisting devices with which my invention may be used.

In the particular embodiments of the invention which are shown herein merely for the purpose of illustrating certain specific forms among possible others that the invention might take in practice, I have diagrammatically indicated their application to a rolling mill wherein a roll is provided with a shaft 1 suitably journalled in a bearing 2. This bearing may be supported in any usual or desired manner but as such structure is well known and does not form a part of my invention, it need not be described in detail. It will of course be understood that the rolls are mounted in pairs between which a sheet of metal or ingot is rolled. The pressure roll is the only one equipped with pressure blocks, one block being provided at each end of the roll. Mounted on top of the bearing 2 is the presure block mechanism generally indicated at 4, while a pressure screw 6 or other pressure mechanism is mounted in any suitable stationary portion of the mill frame to apply varying degrees of pressure to the rolls.

The pressure block per se, indicated at 8, is specifically shown as a solid cylinder which may be of any suitable metal. The block, however, may be made of such shapes and dimensions as are best suited for the pressures involved. One modified form of block or pressure resisting element is shown in Fig. 5 as comprising a pair of co-operating members 8a and 8b recessed as at 8c to permit appreciable axial displacement for a given pressure. The members 8a and 8b may be of any suitable shape in plan view, but irrespective of such shape it is preferable that the edge 8d of one of the elements should be slightly rounded to permit the two elements to have a free and uniform fulcrum action therebetween during axial displacement. As shown in Figs. 6 and 7, the pressure resisting element 8e may be of U-shape or it may be a ring. These members are all referred to as pressure blocks or pressure resisting elements.

The blocks are preferably seated between upper and lower housings 9 and 10 which are preferably transversely split. Suitable tongue and grooves as generally indicated at 11 may be used to provide a lock joint for preventing rotation between the upper and lower housings during rotation of screw 6. This lock joint, however, permits the two halves to move vertically relatively to each other as pressure is applied. Also to permit the complete housing and block to move vertically with the bearing 2, any suitable guides may be provided preferably in the form of channels 12 and 14 suitably held in place on the mill frame.

From the foregoing disclosure it is seen that as screw 6 applies pressure to housings 9 and 10, block 8 will be compressed axially and by well-known effects also expanded radially and circumferentially by an amount directly proportional to the load as long as the unit strain in the block is not carried beyond the proportional limit of the metal. In the form shown in Fig. 1, the circumferential deformation or strain is measured while in the form shown in Figs. 5 and 6 the axial strain is measured and in Fig. 7 the diametrical expansion is measured.

To measure the circumferential expansion of the block, a substantial ring 14 is recessed or relieved at circumferentially spaced points 15 and is axially split to provide adjacent free ends 16. Gage points 17 are adjustably secured in the thick portions of ring 14 to engage the block 8, while across gap 16 is secured a heavy tension spring 28 which, by reason of the flexibility of the ring introduced by the relieved portions 15, maintains the gage points 17 in firm engagement with the block 8 at all times, and counteracts the vibration of the ring which would otherwise be set up by the magnetic action of the air gap transformer.

This air gap transformer generally indicated at 18 is associated with the free ends of the ring, the primary transformer coils 19 and 20, with their respective laminated iron cores, being disposed in axially spaced relation to each other and commonly mounted on a suitable frame which is preferably directly secured as at 21 to one free end of the ring. A secondary coil 22 of the transformer, with its laminated iron core, is also preferably directly secured to the other free end of the ring and is interposed between the field producing or primary coils 19 and 20 which are so connected to the exciting circuit that their magnetic fields are opposed in the core of coil 22, thus permitting the placement of 22 in a neutral position where the resultant current in an external circuit will be zero. As diagrammatically indicated in Fig. 3, the primary coils 19 and 20 are energized by a main source of current such as from a suitable alternating current generator 23 whose field may be suitably controlled or adjusted by a field rheostat 24. A suitable synchronous motor 25 may drive the generator to insure substantially constant voltage for the primary coils. The secondary coil 22 when in a neutral position will not have any current induced therein by reason of the neutralizing effect of the magnetic flux from the two primary coils 19 and 20. The secondary coil 22 is connected in series with a current coil 26 of a suitable indicating mechanism which specifically may be a wattmeter. A voltage coil 27 of the wattmeter may be connected in parallel directly to the primary source of current supplied by generator 23.

In operation, as the plug expands under the load applied thereto, the ring 14 will likewise expand and cause its free ends to spread and thus move the secondary coil 22 out of its neutral position with respect to the magnetic fields of the primary coils 19 and 20. Thereupon current is induced in coil 22 in proportion to its displacement, since the air gap is made of large area in proportion to its length so the magnetic flux is substantially in direct proportion to the length of the gap. As pointed out previously the air gap of the transformer is so disposed at zero strain that there is no current induced in the external circuit, in this case coil 26. It is sometimes desirable to use a single primary coil on the core of 22 and two secondary coils wound so that when placed in opposition on cores of 19 and 20 they will cause zero current in coil 26. This arrangement, in effect the reverse of that shown, in some cases affords straight line performance over a greater change in the air gap.

As a result of my improved arrangement the circuit from the generator 23 furnishes a direct and positive actuating force for the indicating instrument. This permits the transformer 18 to supply only the current that is required. In this manner a strong operating force is subject to a very sensitive control circuit which responds to minute variations in strain of the pressure block. The block is, of course, carefully calibrated to determine the relation of its stress to strain. A further advantage of this improved apparatus is that substantially a straight line function of the load is obtained. This follows, because, as previously pointed out, all of the elements afford straight line functions, viz., the expansion of the block is directly proportional to load as long as the proportional limit of the metal is not exceeded. The current induced in coil 22 is directly proportional to the change in the air gap as long as the length of the gap is small in proportion to the area. Lastly, the scale of the A. C. wattmeter is uniform and directly proportional to the current in coil 26. Hence, since all of the elements are straight line in nature, it follows that the deflections of the indicator must be uniform, and this has been proved by experiment.

In the modifications of Figs. 5 and 6, the transformer coils are attached to the blocks to measure their axial displacement, while in Fig. 7 the coils are arranged to measure the diametrical deformation either longitudinally or transversely of the direction of load.

In the arrangement of Fig. 4, which is preferably the practical embodiment of the electrical connections for measuring roll pressures, I provide two blocks, one for each end of the roll. Each block carries its own split ring and transformer, or, if desired, two split rings with their corresponding transformers may be provided with the secondary coils connected in series or parallel and primary coils in parallel. In Fig. 4, however, I show a single transformer for each block one at 30 and a second at 31. One, or two, but preferably three wattmeters 32, 33 and 34 are placed with their current coils 26 in series with one of the transformers, while the additional wattmeters are similarly placed for the other transformer. The voltage coils 27 of all of the wattmeters, together with the primary coils of the transformers, are connected in parallel to leads 39 and 40 from the A. C. generator 23. Two of the wattmeters, such as 34 and 37, are customarily of the recording type, the remainder being of the indicating type, although either may be dispensed with if desired and the blocks calibrated accordingly.

The advantages of having a multiplicity of wattmeters and recorders as described and a plurality of transformers on each block are that; ordinarily two or more persons at separated points are interested in the operation of a large rolling mill and to have before each of them a meter indicating the roll pressure permits closer coordination of the various processes; and the recorder is a separate unit and may be kept in a closed and locked room, accessible only to the management, the records of which afford an impersonal and unbiased check on the pressures imposed, especially in the case of breakage of bearings, roll necks or other parts of the equipment.

It will of course be understood that various changes in details of construction and arrangement of parts may be made by those skilled in the art without departing from the spirit of the invention as set forth in the appended claim.

I claim:

Apparatus for measuring strain of a plug member comprising, in combination, a split ring circumferentialy encircling said plug and having free end portions relatively movable in proportion to strain of the member, and means for producing a variable current in proportion to said strain, said means including a coil secured directly to one of said free end portions and means directly secured to the other free end of said ring and disposed in the field of flux of said coil so as to be movable therein in proportion to strain.

ORVILLE S. PETERS.